United States Patent
Kim et al.

(10) Patent No.: US 10,636,295 B1
(45) Date of Patent: Apr. 28, 2020

(54) METHOD AND DEVICE FOR CREATING TRAFFIC SCENARIO WITH DOMAIN ADAPTATION ON VIRTUAL DRIVING ENVIRONMENT FOR TESTING, VALIDATING, AND TRAINING AUTONOMOUS VEHICLE

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/731,066

(22) Filed: Dec. 31, 2019

Related U.S. Application Data

(60) Provisional application No. 62/798,705, filed on Jan. 30, 2019.

(51) Int. Cl.
*G08G 1/01* (2006.01)
*G06K 9/00* (2006.01)
(Continued)

(52) U.S. Cl.
CPC ....... *G08G 1/0129* (2013.01); *G06K 9/00711* (2013.01); *G06K 9/00791* (2013.01); (Continued)

(58) Field of Classification Search
CPC ............. G08G 1/0129; G06K 9/00711; G06K 9/00791; G06N 3/0445; G06N 3/08
See application file for complete search history.

(56) References Cited

U.S. PATENT DOCUMENTS 8,874,301 B1 * 10/2014 Rao ........................ B60K 28/04
701/25
10,118,628 B2 * 11/2018 Lundsgaard .......... B60W 10/20
(Continued)

OTHER PUBLICATIONS

Kaur, Parampreet & Sobti, Rajeev. (2018). Scenario-Based Simulation of Intelligent Driving Functions Using Neural Networks. 1-5. 10.1109/ICCCNT.2018.8494086. (Year: 2018).*
(Continued)

*Primary Examiner* — Utpal D Shah
(74) *Attorney, Agent, or Firm* — Xsensus LLP

(57) ABSTRACT

A method for creating a traffic scenario in a virtual driving environment is provided. The method includes steps of: a traffic scenario-generating device, (a) on condition that driving data have been acquired which are created using previous traffic data corresponding to discrete traffic data extracted by a vision-based ADAS from a past driving video and detailed traffic data corresponding to sequential traffic data from sensors of data-collecting vehicles in a real driving environment, inputting the driving data into a scene analyzer to extract driving environment information and into a vehicle information extractor to extract vehicle status information on an ego vehicle, and generating sequential traffic logs according to a driving sequence; and (b) inputting the sequential traffic logs into a scenario augmentation network to augment the sequential traffic logs using critical (Continued)

events, and generate the traffic scenario, verifying the traffic scenario, and mapping the traffic scenario onto a traffic simulator.

16 Claims, 5 Drawing Sheets

(51) Int. Cl.
  *G06N 3/08* (2006.01)
  *G06N 3/04* (2006.01)
(52) U.S. Cl.
  CPC ............. *G06N 3/0445* (2013.01); *G06N 3/08* (2013.01); *G06K 2009/00738* (2013.01)

(56) References Cited

U.S. PATENT DOCUMENTS

| | | | |
|---|---|---|---|
| 10,229,590 B2* | 3/2019 | Du | G08G 1/09 |
| 2018/0101172 A1* | 4/2018 | Min | H04W 4/023 |
| 2019/0295335 A1* | 9/2019 | Amelunxen | G05D 1/0088 |
| 2019/0384292 A1* | 12/2019 | Aragon | G05D 1/0088 |

OTHER PUBLICATIONS

W. Huang, Kunfeng Wang, Yisheng Lv and FengHua Zhu, "Autonomous vehicles testing methods review," 2016 IEEE 19th International Conference on Intelligent Transportation Systems (ITSC), Rio de Janeiro, 2016, pp. 163-168. (Year: 2016).*

Bücs, Róbert & Lakshman, Pramod & Weinstock, Jan & Walbroel, Florian & Leupers, Rainer & Ascheid, Gerd. (2018). Fully Virtual Rapid ADAS Prototyping via a Joined Multi-domain Co-simulation Ecosystem. 59-69. 10.5220/0006665900590069. (Year: 2018).*

* cited by examiner

METHOD AND DEVICE FOR CREATING TRAFFIC SCENARIO WITH DOMAIN ADAPTATION ON VIRTUAL DRIVING ENVIRONMENT FOR TESTING, VALIDATING, AND TRAINING AUTONOMOUS VEHICLE

CROSS REFERENCE TO RELATED APPLICATION

This application claims the benefit of priority to U.S. Provisional Patent Application No. 62/798,705, filed on Jan. 30, 2019, the entire contents of which are incorporated herein by reference.

FIELD OF THE DISCLOSURE

The present disclosure relates to a virtual driving environment for learning an autonomous vehicle; and more particularly, to a method and a device for generating traffic scenarios in the virtual driving environment for learning, testing, and validating the autonomous vehicle.

BACKGROUND OF THE DISCLOSURE

Modern vehicles, especially automobiles, increasingly provide autonomous driving and driving assistance systems such as blind spot monitors, automatic parking, and automatic navigation. Testing and validating the autonomous driving and the driving assistance systems, however, is highly complex and can require prolonged road testing (e.g., millions of hours and miles). The testing and validation effort is multiplied when considering that updates to the autonomous driving and the driving assistance systems can require revalidation, and separate validation may be required for different vehicles types.

In addition, it is also difficult to secure sufficient training data for learning autonomous driving systems and the driving assistance systems of autonomous vehicles.

Therefore, a method for training, testing, and validating the autonomous driving systems and the driving assistance systems of the autonomous vehicles operating in a virtual driving environment in which an actual driving situation is virtualized has been proposed.

In order to train, test, and validate the autonomous driving systems and the driving assistance systems of the autonomous vehicles in the virtual driving environment, scenarios for information on surroundings in the virtual driving environment should be provided.

However, in a conventional virtual driving environment, because scenarios only for specific traffic conditions are provided, a variety of sophisticated scenarios as in the actual driving environment cannot be provided.

SUMMARY OF THE DISCLOSURE

It is an object of the present disclosure to solve all the aforementioned problems.

It is another object of the present disclosure to create various and elaborate traffic scenarios in a virtual driving environment, similar to those in an actual driving environment.

It is still another object of the present disclosure to create the various and elaborate traffic scenarios in the virtual driving environment by data augmentation.

In accordance with one aspect of the present disclosure, there is provided a method for creating at least one traffic scenario in at least one virtual driving environment, including steps of: (a) on condition that driving data, created by referring to previous traffic data and detailed traffic data, have been acquired wherein the previous traffic data are meta data corresponding to discrete traffic data extracted by a vision-based ADAS (Advanced Driver Assistance System) from at least one past driving video including at least one driving event and wherein the detailed traffic data are meta data corresponding to sequential traffic data collected from one or more sensors of one or more data-collecting vehicles being driven in a real driving environment, a traffic scenario-generating device performing a process of inputting the driving data into a scene analyzer, to thereby allow the scene analyzer to extract driving environment information from the driving data, a process of inputting the driving data into a vehicle information extractor, to thereby allow the vehicle information extractor to extract vehicle status information on an ego vehicle from the driving data, and a process of generating sequential traffic logs according to a driving sequence including the driving event by referring to the driving environment information and the vehicle status information; and (b) the traffic scenario-generating device performing a process of inputting the sequential traffic logs into a scenario augmentation network, to thereby allow the scenario augmentation network to augment the sequential traffic logs by using at least one critical event as at least one condition such that the sequential traffic logs correspond to an event driving environment of the critical event, and thus to generate the traffic scenario, a process of verifying the traffic scenario by referring to predetermined reference traffic information, and a process of mapping the traffic scenario onto a traffic simulator in a virtual driving environment if the traffic scenario is determined as valid.

As one example, the traffic scenario-generating device allows the scenario augmentation network to generate predicted traffic logs as their corresponding next actions via a generator including LSTMs (long short-term memories) while the generator sets an initial traffic log among the sequential traffic logs as a state of the generator to be used for acquiring a next action, among the next actions, of an initial LSTM among the LSTMs, to thereby generate the traffic scenario via the generator, and wherein the predicted traffic logs are to come after the initial traffic log and are augmented such that the predicted traffic logs correspond to the event driving environment.

As one example, the traffic scenario-generating device performs a process of learning a discriminator such that the discriminator distinguishes between the sequential traffic logs and the predicted traffic logs, and a process of optimizing at least one parameter of the generator via a policy gradient using at least one reward of the discriminator wherein the reward is created by referring to the sequential traffic logs, the predicted traffic logs, and the condition.

As one example, at the step of (b), if the traffic scenario is determined as invalid, the traffic scenario-generating device performs a process of generating at least one changed condition by changing the condition by referring to the process of verifying, and a process of allowing the scenario augmentation network to augment the sequential traffic logs using the changed condition, to thereby generate a new traffic scenario.

As one example, the traffic scenario-generating device extracts the critical event from sequential data, or extracts the critical event from a critical event database.

As one example, each of the sequential traffic logs includes the number of at least one object, a location of the object, the number of at least one pedestrian, a location of the pedestrian, at least one trajectory of the object, and traffic signal change information.

As one example, the vision-based ADAS performs at least one of object detection, distance estimation, traffic signal recognition (TSR), lane detection, lane mark detection, time to collision (TTC) estimation, and relative velocity estimation, which use the past driving video.

As one example, the vehicle status information includes at least one of a velocity of the ego vehicle, an acceleration of the ego vehicle, a steering wheel status of the ego vehicle, a position of an accelerator pedal of the ego vehicle, and a brake status of the ego vehicle.

In accordance with another aspect of the present disclosure, there is provided a traffic scenario-generating device for creating at least one traffic scenario in at least one virtual driving environment, including: at least one memory that stores instructions; and at least one processor configured to execute the instructions to perform or support another device to perform: (I) on condition that driving data, created by referring to previous traffic data and detailed traffic data, have been acquired wherein the previous traffic data are meta data corresponding to discrete traffic data extracted by a vision-based ADAS (Advanced Driver Assistance System) from at least one past driving video including at least one driving event and wherein the detailed traffic data are meta data corresponding to sequential traffic data collected from one or more sensors of one or more data-collecting vehicles being driven in a real driving environment, a process of inputting the driving data into a scene analyzer, to thereby allow the scene analyzer to extract driving environment information from the driving data, a process of inputting the driving data into a vehicle information extractor, to thereby allow the vehicle information extractor to extract vehicle status information on an ego vehicle from the driving data, and a process of generating sequential traffic logs according to a driving sequence including the driving event by referring to the driving environment information and the vehicle status information, and (II) a process of inputting the sequential traffic logs into a scenario augmentation network, to thereby allow the scenario augmentation network to augment the sequential traffic logs by using at least one critical event as at least one condition such that the sequential traffic logs correspond to an event driving environment of the critical event, and thus to generate the traffic scenario, a process of verifying the traffic scenario by referring to predetermined reference traffic information, and a process of mapping the traffic scenario onto a traffic simulator in a virtual driving environment if the traffic scenario is determined as valid.

As one example, the processor allows the scenario augmentation network to generate predicted traffic logs as their corresponding next actions via a generator including LSTMs (long short-term memories) while the generator sets an initial traffic log among the sequential traffic logs as a state of the generator to be used for acquiring a next action, among the next actions, of an initial LSTM among the LSTMs, to thereby generate the traffic scenario via the generator, and wherein the predicted traffic logs are to come after the initial traffic log and are augmented such that the predicted traffic logs correspond to the event driving environment.

As one example, the processor performs a process of learning a discriminator such that the discriminator distinguishes between the sequential traffic logs and the predicted traffic logs, and a process of optimizing at least one parameter of the generator via a policy gradient using at least one reward of the discriminator wherein the reward is created by referring to the sequential traffic logs, the predicted traffic logs, and the condition.

As one example, at the process of (II), if the traffic scenario is determined as invalid, the processor performs a process of generating at least one changed condition by changing the condition by referring to the process of verifying, and a process of allowing the scenario augmentation network to augment the sequential traffic logs using the changed condition, to thereby generate a new traffic scenario.

As one example, the processor extracts the critical event from sequential data, or extracts the critical event from a critical event database.

As one example, each of the sequential traffic logs includes the number of at least one object, a location of the object, the number of at least one pedestrian, a location of the pedestrian, at least one trajectory of the object, and traffic signal change information.

As one example, the vision-based ADAS performs at least one of object detection, distance estimation, traffic signal recognition (TSR), lane detection, lane mark detection, time to collision (TTC) estimation, and relative velocity estimation, which use the past driving video.

As one example, 6 the vehicle status information includes at least one of a velocity of the ego vehicle, an acceleration of the ego vehicle, a steering wheel status of the ego vehicle, a position of an accelerator pedal of the ego vehicle, and a brake status of the ego vehicle.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
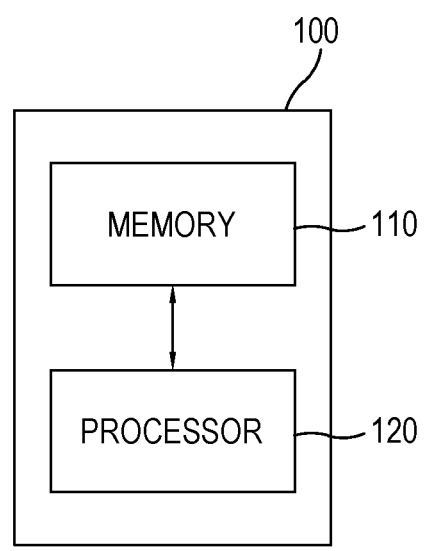
FIG. 1 is a drawing schematically illustrating a traffic scenario-generating device for generating at least one traffic scenario in a virtual driving environment in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a traffic scenario-generating device for generating at least one traffic scenario in a virtual driving environment in accordance with one example embodiment of the present disclosure. By referring to FIG. 1, the traffic scenario-generating device 100 may include a memory 110 for storing instructions to generate the traffic scenario in the virtual driving environment, and a processor 120 for performing processes corresponding to the instructions in the memory 110 to generate the traffic scenario in the virtual driving environment.

Specifically, the traffic scenario-generating device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
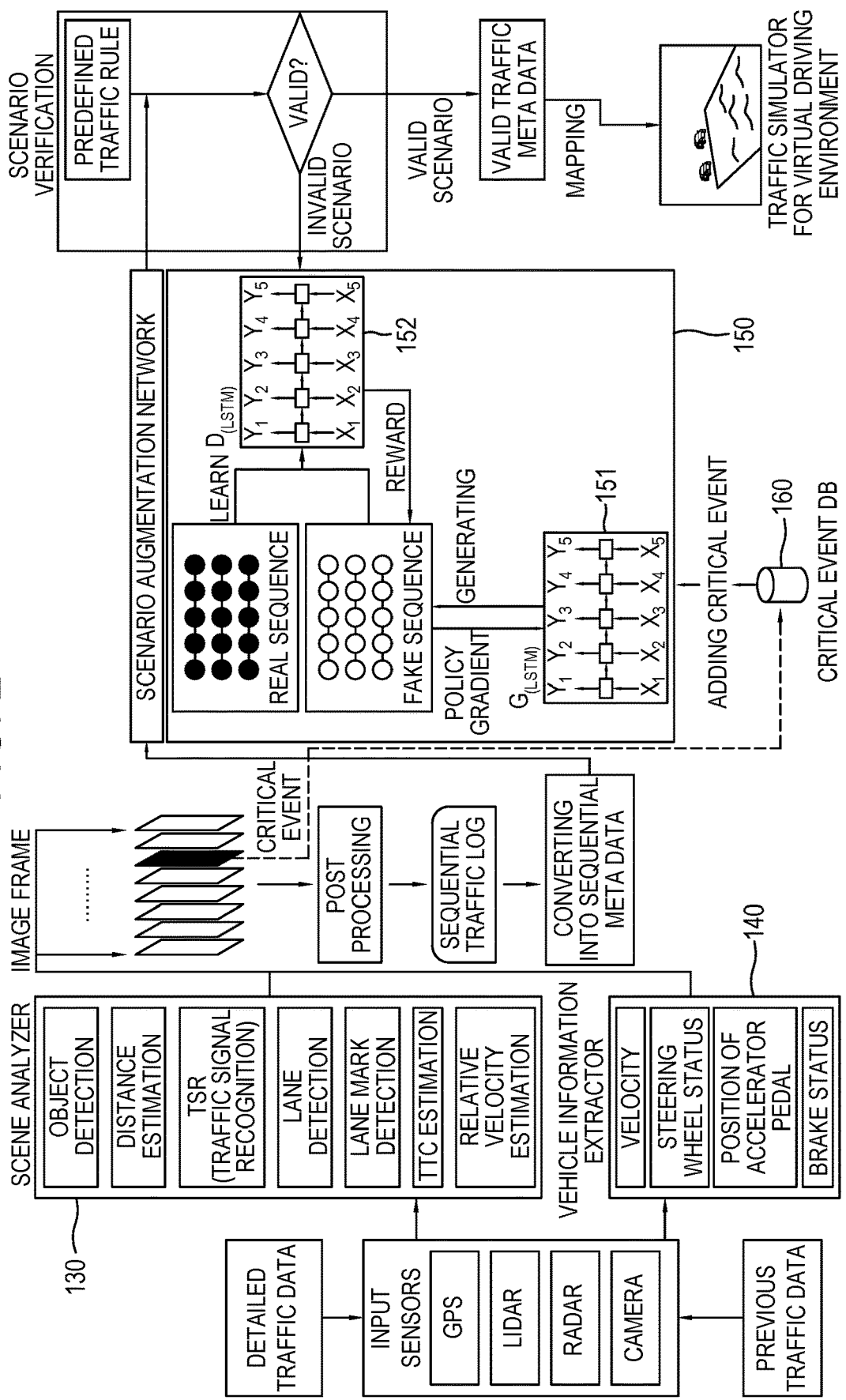
FIG. 2 is a drawing schematically illustrating a scenario-generating method for generating the traffic scenario in the virtual driving environment in accordance with one example embodiment of the present disclosure.

A method for generating the traffic scenario in the virtual driving environment by using the traffic scenario-generating device 100 in accordance with one example embodiment of the present disclosure is described by referring to FIG. 2 as follows.

First, the traffic scenario-generating device 100 may acquire or support another device to acquire previous traffic data and detailed traffic data.

Herein, the previous traffic data may be data difficult to acquire in an actual driving environment, like a car accident, and may be meta data extracted from at least one past driving video including at least one driving event by using an ADAS (Advanced Driver Assistance System) based on a current computer vision technology. Meanwhile, the ADAS may perform at least one of object detection, distance estimation, traffic signal recognition (TSR), lane detection, lane mark detection, time to collision (TTC) estimation, and relative velocity estimation, which utilize the past driving video.

And, the detailed traffic data may be meta data collected from one or more sensors, like a LiDAR, a radar, a camera, a GPS device, etc., of a vehicle being driven in a real driving environment.

Meanwhile, the previous traffic data may be discrete traffic data, and the detailed traffic data may be sequential traffic data.

Next, the traffic scenario-generating device 100 may acquire driving data by referring to the previous traffic data and the detailed traffic data. As one example, the driving data may be the driving data related to the vehicle, such as information from the GPS device, the LiDAR, the radar, the camera, etc. corresponding to input sensors of the vehicle.

And, the traffic scenario-generating device 100 may perform a process of inputting the driving data into a scene analyzer 130, to thereby allow the scene analyzer 130 to extract driving environment information from the driving data, and a process of inputting the driving data into a vehicle information extractor 140, to thereby allow the vehicle information extractor 140 to extract vehicle status information on an ego vehicle from the driving data. Herein, as well-known to those skilled in the art, the ego vehicle may mean a subject vehicle, for example, a vehicle being driven in the virtual driving environment in accordance with the present disclosure.

As one example, the scene analyzer 130 may acquire at least part of object detection information, distance estimation information, traffic signal recognition (TSR) information, lane detection information, lane mark detection information, time to collision (TTC) estimation information, relative velocity estimation information, etc. from the driving data.

Also, the vehicle information extractor 140 may extract at least one of: a velocity of the ego vehicle, an acceleration of the ego vehicle, a steering wheel status of the ego vehicle, a position of an accelerator pedal of the ego vehicle, and a brake status of the ego vehicle, etc.

Next, the traffic scenario-generating device 100 may generate sequential traffic logs according to a driving sequence including the driving event, by referring to the driving environment information from the scene analyzer 130 and the vehicle status information from the vehicle information extractor 140.

As one example, the traffic scenario-generating device 100 may generate image frames by matching the driving environment information acquired by the scene analyzer 130 with the vehicle status information acquired from the vehicle information extractor 140. Herein, the image frames may be discrete and sequential data, and the discrete and sequential data may be the driving data before and after occurrences of specific events, such as a tunnel/bridge-entering event, a lane-changing event, and a tunnel/bridge-passing through event.

And, the traffic scenario-generating device 100 may post-process the driving event included in the discrete and sequential data, to thereby generate one or more sequential traffic logs which are discrete and sequential second-processed data.

Herein, each of the sequential traffic logs may include the number of at least one object, a location of the object, the number of at least one pedestrian, a location of the pedestrian, at least one trajectory of the object, and traffic signal change information, etc.

Thereafter, the traffic scenario-generating device 100 may convert the sequential traffic logs into sequential meta data.

That is, the traffic scenario-generating device 100 may instruct at least one sequential meta data converter to encode data, extracted by the scene analyzer 130 and the vehicle information extractor 140, included in the sequential traffic logs, such that at least one traffic simulator recognizes the encoded data.

Next, the traffic scenario-generating device 100 may perform a process of inputting the sequential traffic logs into a scenario augmentation network 150, to thereby allow the scenario augmentation network 150 to augment the sequential traffic logs by using at least one critical event as at least one condition such that the sequential traffic logs correspond to an event driving environment of the critical event, and thus to generate the traffic scenario.

As one example, the scenario augmentation network 150 may generate one or more predicted traffic logs as their corresponding next actions via a generator 151 including LSTMs (long short-term memories) while the generator 151 sets an initial traffic log among the sequential traffic logs as a state of the generator 151 to be used for acquiring a next action, among the next actions, of an initial LSTM among the LSTMs, to thereby generate the traffic scenario via the generator 151, where the predicted traffic logs are to come after the initial traffic log and may be augmented such that the predicted traffic logs correspond to the event driving environment.

Figure 3:
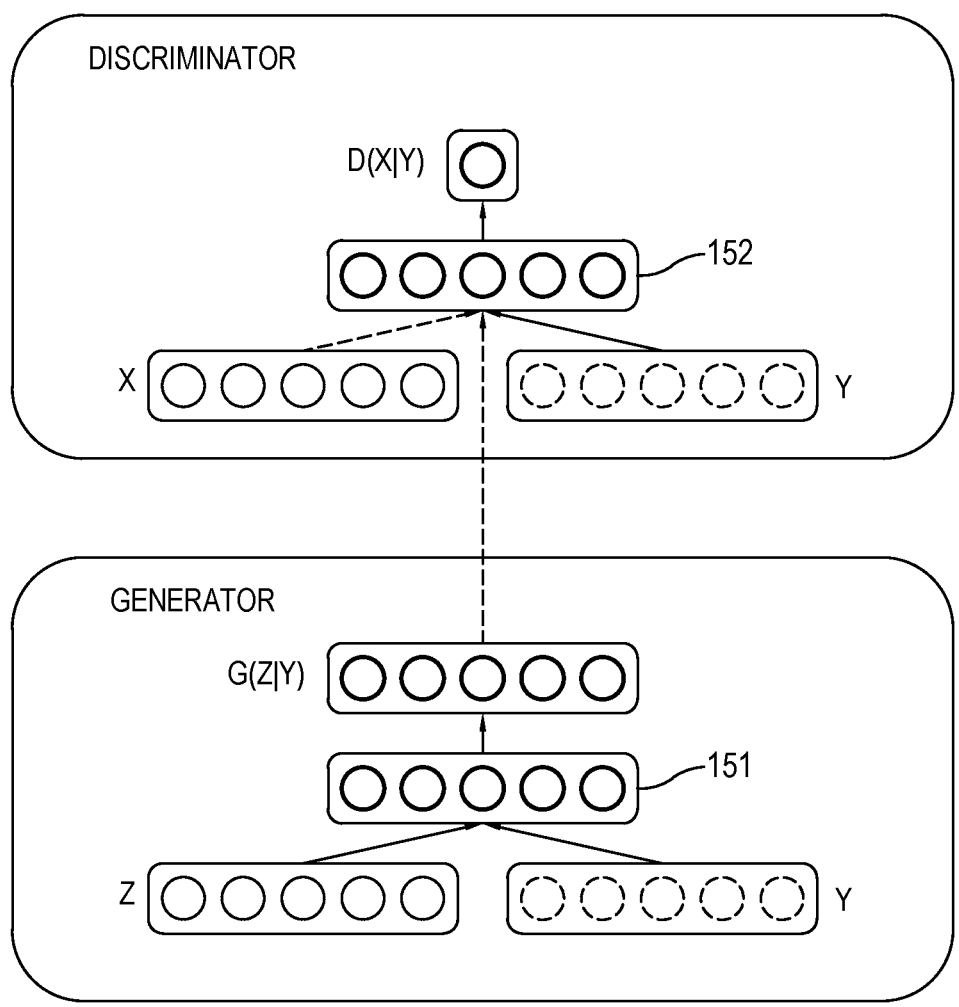
FIG. 3 is a drawing schematically illustrating a process of adding at least one condition in the method for generating the traffic scenario in the virtual driving environment in accordance with one example embodiment of the present disclosure.

By referring to FIG. 3, the scenario augmentation network 150 may input at least one latent code z and at least one critical event y into the generator 151, to thereby allow the generator 151 to generate the predicted traffic logs corresponding to the initial traffic log, such that the predicted traffic logs correspond to the critical event in the driving environment.

Herein, the critical event may be extracted from sequential data, or a specific critical event may be retrieved from a critical event database 160 which stores various critical events.

As one example, the critical event may be a specific driving event among driving events such as sudden braking in emergency, a change of a traffic signal on a crossroad, and various conditions, such as a change of a green light into a red light on the crossroad, may be set, and according to the critical event and the conditions, the generator 151 may generate various traffic scenarios as in the real driving environment.

Meanwhile, the scenario augmentation network 150 may have a structure such that the generator 151 for generating the traffic scenario and a discriminator 152 for evaluating the traffic scenario learn competitively in parallel to each other, and that, as a result, the generator outputs refined data capable of deceiving the discriminator.

The scenario augmentation network 150 may be comprised of at least one state and at least one action thus easy to model the discrete data, and may use a policy gradient which is a policy-based reinforcement learning technique capable of partially acquiring a stochastic policy based on a reward, to thereby learn the generator 151. Also, a Monte Carlo policy gradient among policy gradient techniques may be used. Herein, the Monte Carlo policy gradient is a learning technique that generates the stochastic policy by using (i) a roll-out policy which is one of networks capable of predicting a next state from a current state, and (ii) a Monte Carlo tree search (MCTS) which is one of efficient non-exhaustive search algorithms. As one example, the state may be set as a token, the action may be set as an activity which assigns a next token, and an agent may be set as the generator 151. And a label determined by the discriminator 152 may be modeled as the reward, to thereby learn the generator 151. Herein, the generator 151 may use at least one LSTM, which does not have a vanishing gradient problem, in RNNs, and the discriminator 152 may use a CNN.

Figure 4:
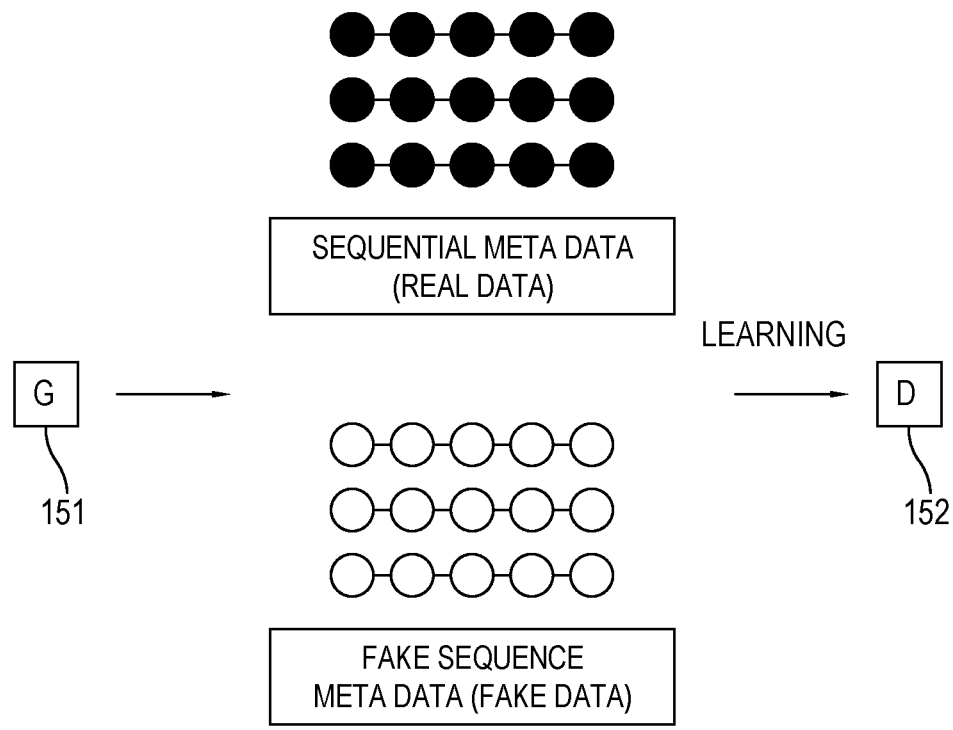
FIGS. 4 and 5 are drawings schematically illustrating a process of learning a scenario augmentation network in the method for generating the traffic scenario in the virtual driving environment in accordance with one example embodiment of the present disclosure.
Figure 5:
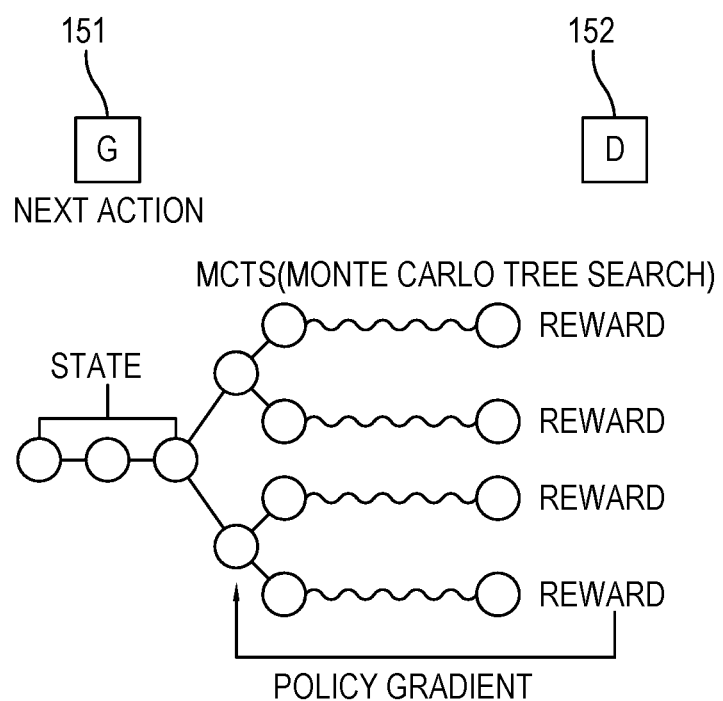

That is, by referring to FIGS. 4 and 5, the scenario augmentation network 150 may input the predicted traffic logs created by the generator 151 and the sequential traffic logs into the discriminator 152, to thereby allow the discriminator 152 to determine whether its input data is real or fake, and may learn the discriminator 152 using one or more outputs from the discriminator 152 such that the discriminator 152 distinguishes between the sequential traffic logs and the predicted traffic logs.

Also, after learning the discriminator 152, the scenario augmentation network 150 may generate the predicted traffic logs as their corresponding next actions via the generator 151 including the LSTMs (long short-term memories) while the generator 151 sets the initial traffic log among the sequential traffic logs as a state of the generator 151 to be used for acquiring a next action, among the next actions, of an initial LSTM among the LSTMs, and may input the sequential traffic logs, the predicted traffic logs, and the condition into the discriminator 152, to thereby allow the discriminator 152 to output at least one reward which represents whether the predicted traffic logs are created appropriately to the sequential traffic logs and the condition. And, the scenario augmentation network 150 may learn the generator 151 by referring to the policy gradient which uses the reward.

Next, the traffic scenario-generating device 100 may perform a process of verifying the traffic scenario by referring to preset reference traffic information.

Herein, the traffic scenario-generating device 100 may determine whether the traffic scenario is valid by comparing a minimal set of predefined traffic rule information and the traffic scenario. As one example, supposing that the traffic scenario includes an entry event into a highway, and that every event in the traffic scenario occurs while traveling on the highway, and if there is the traffic rule information which prohibits any traffic signals on the highway by referring to a traffic regulations DB, then any event related to the traffic signals is invalid.

And, if the generated traffic scenario is determined as valid, the traffic scenario-generating device 100 may match the traffic scenario with the traffic simulator for the virtual driving environment.

Meanwhile, if the traffic scenario is determined as invalid, the traffic scenario-generating device 100 may perform a process of generating at least one changed condition by changing the condition by referring to the process of verifying, and may perform a process of allowing the scenario augmentation network 150 to augment the sequential traffic logs using the changed condition, to thereby generate a new traffic scenario.

As described above, the present disclosure generates static data and the sequential data of a specific traffic situation, generates the traffic scenario of target vehicles, pedestrians, etc. which are information on surroundings in the virtual driving environment, maps the generated traffic scenario onto the traffic simulator for the virtual driving environment, and uses the generated traffic scenario for virtual driving.

The present disclosure has an effect of creating the elaborate traffic scenarios in the virtual driving environment based on actual driving data.

The present disclosure has another effect of creating the various traffic scenarios in the virtual driving environment by augmenting the discreet and sequential data of the specific traffic situation.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art.

Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for creating at least one traffic scenario in at least one virtual driving environment, comprising steps of:

(a) on condition that driving data, created by referring to previous traffic data and detailed traffic data, have been acquired wherein the previous traffic data are meta data corresponding to discrete traffic data extracted by a vision-based ADAS (Advanced Driver Assistance System) from at least one past driving video including at least one driving event and wherein the detailed traffic data are meta data corresponding to sequential traffic data collected from one or more sensors of one or more data-collecting vehicles being driven in a real driving environment, a traffic scenario-generating device performing a process of inputting the driving data into a scene analyzer, to thereby allow the scene analyzer to extract driving environment information from the driving data, a process of inputting the driving data into a vehicle information extractor, to thereby allow the vehicle information extractor to extract vehicle status information on an ego vehicle from the driving data, and a process of generating sequential traffic logs according to a driving sequence including the driving event by referring to the driving environment information and the vehicle status information; and (b) the traffic scenario-generating device performing a process of inputting the sequential traffic logs into a scenario augmentation network, to thereby allow the scenario augmentation network to augment the sequential traffic logs by using at least one critical event as at least one condition such that the sequential traffic logs correspond to an event driving environment of the critical event, and thus to generate the traffic scenario, a process of verifying the traffic scenario by referring to predetermined reference traffic information, and a process of mapping the traffic scenario onto a traffic simulator in a virtual driving environment if the traffic scenario is determined as valid.

2. The method of claim 1, wherein the traffic scenario-generating device allows the scenario augmentation network to generate predicted traffic logs as their corresponding next actions via a generator including LSTMs (long short-term memories) while the generator sets an initial traffic log among the sequential traffic logs as a state of the generator to be used for acquiring a next action, among the next actions, of an initial LSTM among the LSTMs, to thereby generate the traffic scenario via the generator, and wherein the predicted traffic logs are to come after the initial traffic log and are augmented such that the predicted traffic logs correspond to the event driving environment.

3. The method of claim 2, wherein the traffic scenario-generating device performs a process of learning a discriminator such that the discriminator distinguishes between the sequential traffic logs and the predicted traffic logs, and a process of optimizing at least one parameter of the generator via a policy gradient using at least one reward of the discriminator wherein the reward is created by referring to the sequential traffic logs, the predicted traffic logs, and the condition.

4. The method of claim 1, wherein, at the step of (b), if the traffic scenario is determined as invalid, the traffic scenario-generating device performs a process of generating at least one changed condition by changing the condition by referring to the process of verifying, and a process of allowing the scenario augmentation network to augment the sequential traffic logs using the changed condition, to thereby generate a new traffic scenario.

5. The method of claim 1, wherein the traffic scenario-generating device extracts the critical event from sequential data, or extracts the critical event from a critical event database.

6. The method of claim 1, wherein each of the sequential traffic logs includes the number of at least one object, a location of the object, the number of at least one pedestrian, a location of the pedestrian, at least one trajectory of the object, and traffic signal change information.

7. The method of claim 1, wherein the vision-based ADAS performs at least one of object detection, distance estimation, traffic signal recognition (TSR), lane detection, lane mark detection, time to collision (TTC) estimation, and relative velocity estimation, which use the past driving video.

8. The method of claim 1, wherein the vehicle status information includes at least one of a velocity of the ego vehicle, an acceleration of the ego vehicle, a steering wheel status of the ego vehicle, a position of an accelerator pedal of the ego vehicle, and a brake status of the ego vehicle.

9. A traffic scenario-generating device for creating at least one traffic scenario in at least one virtual driving environment, comprising:
at least one memory that stores instructions; and
at least one processor configured to execute the instructions to perform or support another device to perform: (I) on condition that driving data, created by referring to previous traffic data and detailed traffic data, have been acquired wherein the previous traffic data are meta data corresponding to discrete traffic data extracted by a vision-based ADAS (Advanced Driver Assistance System) from at least one past driving video including at least one driving event and wherein the detailed traffic data are meta data corresponding to sequential traffic data collected from one or more sensors of one or more data-collecting vehicles being driven in a real driving environment, a process of inputting the driving data into a scene analyzer, to thereby allow the scene analyzer to extract driving environment information from the driving data, a process of inputting the driving data into a vehicle information extractor, to thereby allow the vehicle information extractor to extract vehicle status information on an ego vehicle from the driving data, and a process of generating sequential traffic logs according to a driving sequence including the driving event by referring to the driving environment information and the vehicle status information, and (II) a process of inputting the sequential traffic logs into a scenario augmentation network, to thereby allow the scenario augmentation network to augment the sequential traffic logs by using at least one critical event as at least one condition such that the sequential traffic logs correspond to an event driving environment of the critical event, and thus to generate the traffic scenario, a process of verifying the traffic scenario by referring to predetermined reference traffic information, and a process of mapping the traffic scenario onto a traffic simulator in a virtual driving environment if the traffic scenario is determined as valid.

10. The traffic scenario-generating device of claim 9, wherein the processor allows the scenario augmentation network to generate predicted traffic logs as their corresponding next actions via a generator including LSTMs (long short-term memories) while the generator sets an initial traffic log among the sequential traffic logs as a state of the generator to be used for acquiring a next action, among the next actions, of an initial LSTM among the LSTMs, to thereby generate the traffic scenario via the generator, and wherein the predicted traffic logs are to come after the initial traffic log and are augmented such that the predicted traffic logs correspond to the event driving environment.

11. The traffic scenario-generating device of claim 10, wherein the processor performs a process of learning a discriminator such that the discriminator distinguishes between the sequential traffic logs and the predicted traffic logs, and a process of optimizing at least one parameter of the generator via a policy gradient using at least one reward of the discriminator wherein the reward is created by referring to the sequential traffic logs, the predicted traffic logs, and the condition.

12. The traffic scenario-generating device of claim 9, wherein, at the process of (II), if the traffic scenario is determined as invalid, the processor performs a process of generating at least one changed condition by changing the condition by referring to the process of verifying, and a process of allowing the scenario augmentation network to augment the sequential traffic logs using the changed condition, to thereby generate a new traffic scenario.

13. The traffic scenario-generating device of claim 9, wherein the processor extracts the critical event from sequential data, or extracts the critical event from a critical event database.

14. The traffic scenario-generating device of claim 9, wherein each of the sequential traffic logs includes the number of at least one object, a location of the object, the number of at least one pedestrian, a location of the pedestrian, at least one trajectory of the object, and traffic signal change information.

15. The traffic scenario-generating device of claim 9, wherein the vision-based ADAS performs at least one of object detection, distance estimation, traffic signal recognition (TSR), lane detection, lane mark detection, time to collision (TTC) estimation, and relative velocity estimation, which use the past driving video.

16. The traffic scenario-generating device of claim 9, wherein the vehicle status information includes at least one of a velocity of the ego vehicle, an acceleration of the ego vehicle, a steering wheel status of the ego vehicle, a position of an accelerator pedal of the ego vehicle, and a brake status of the ego vehicle.

* * * * *